(12) United States Patent
Zhang et al.

(10) Patent No.: US 6,327,219 B1
(45) Date of Patent: Dec. 4, 2001

(54) METHOD AND SYSTEM FOR DIRECTING A FOLLOWING DEVICE TOWARD A MOVABLE OBJECT

(75) Inventors: Ruiming Zhang, South Windsor, CT (US); John Moh, Freshmeadows, NY (US)

(73) Assignee: VI&T Group, Freshmeadows, NY (US)

( * ) Notice: Subject to any disclaimer, the term of this patent is extended or adjusted under 35 U.S.C. 154(b) by 0 days.

(21) Appl. No.: 09/407,795

(22) Filed: Sep. 29, 1999

(51) Int. Cl.[7] .................................................. G01S 3/80
(52) U.S. Cl. ............................................. 367/128; 342/55
(58) Field of Search .............................. 367/128; 342/55; 340/825.54, 825.49, 825.72, 539

(56) References Cited

U.S. PATENT DOCUMENTS

| | | |
|---|---|---|
| 3,473,623 | 10/1969 | Meek, Jr. . |
| 3,696,384 | 10/1972 | Lester . |
| 3,720,281 | 3/1973 | Frownfelter . |
| 3,742,507 | 6/1973 | Pirre . |
| 3,812,929 | 5/1974 | Farque . |
| 3,856,104 | 12/1974 | Ohba . |
| 4,030,062 | 6/1977 | Diehl et al. . |
| 4,249,176 | 2/1981 | Oishi et al. . |
| 4,600,913 | 7/1986 | Caine . |
| 4,751,689 * | 6/1988 | Kobayashi ........................ 367/128 |
| 4,758,691 | 7/1988 | De Bruyne . |
| 4,918,441 | 4/1990 | Bohman . |
| 5,153,599 | 10/1992 | Atsumi . |
| 5,187,537 | 2/1993 | Asayama . |
| 5,295,551 | 3/1994 | Sukonick . |
| 5,339,259 | 8/1994 | Puma et al. . |
| 5,392,257 | 2/1995 | Gilmour . |
| 5,495,427 | 2/1996 | Puma et al. . |
| 5,517,098 | 5/1996 | Dong . |
| 5,528,232 * | 6/1996 | Verma et al. .................... 340/825.54 |
| 5,611,406 | 3/1997 | Matsuzaki et al. . |
| 5,657,828 | 8/1997 | Nagamachi . |
| 5,659,320 | 8/1997 | Pouit . |
| 5,708,421 | 1/1998 | Boyd . |
| 5,711,388 | 1/1998 | Davies et al. . |
| 5,810,105 | 9/1998 | Trainer . |
| 5,831,937 * | 11/1998 | Weir et al. ........................... 367/128 |
| 6,142,251 | 11/2000 | Bail . |

FOREIGN PATENT DOCUMENTS

| | | |
|---|---|---|
| 0 492 015 A1 | 7/1992 | (EP) . |
| 2 283 838 A | 5/1995 | (GB) . |

* cited by examiner

Primary Examiner—Ian J. Lobo
(74) Attorney, Agent, or Firm—McCormick, Paulding & Huber LLP

(57) ABSTRACT

An automated object following system includes a tracker associated with a following device, and a guider associated with an object to be followed. The tracker includes a first processor, and at least two transducers for generating an encoded ultrasonic signal. Each transducer has a control input communicating with the first processor for emitting an encoded ultrasonic signal generally toward the guider in response to a command signal from the first processor. The encoded ultrasonic signals carry signal source identification information. A radio frequency (RF) receiver communicates with the first processor for receiving from the guider an encoded RF signal carrying distance and direction information of the guider relative to the tracker to be used for steering the following device toward the object to be followed.

30 Claims, 7 Drawing Sheets

METHOD AND SYSTEM FOR DIRECTING A FOLLOWING DEVICE TOWARD A MOVABLE OBJECT

FIELD OF THE INVENTION

The present invention relates generally to a following system, and more particularly to a method and system for automatically directing a following device toward a movable object.

BACKGROUND OF THE INVENTION

Automatic following systems have wide applications in automobiles, sports, entertainment, and even toys. As an illustration, a following systems may be employed in a golf cart application. To play golf, a golfer always needs to bring a club bag around a golf course. While a club bag is necessary, it is often too heavy or cumbersome to be conveniently carried. Currently, a player has several choices. First, the player can pay for a caddie to carry the club bag. A drawback is that paying for a caddie is expensive. Second, the player can drive a golf car. This option is less expensive than hiring a caddie, but the golf car might be restricted from some areas. Third, the player can pull a golf cart or simply carry the club bag. However, pulling the golf cart or carrying the bag can make the game less enjoyable. Fourth, the player might use a battery-powered electronic cart.

Current electronic golf carts offer manual control buttons on the cart. A golfer can then set cart speed, and command it to move or stop. Some carts are even equipped with remote controllers so that a golfer can control a cart from a distance. However, none of the existing carts has automatic following capability. Therefore, these carts have the following drawbacks. First, a golfer still needs to worry about controlling the cart. Second, a golf cart may hit a person and cause injury. Third, a golfer may lose balls because of distractions caused by controlling the golf cart.

Automatic tracking, following, or positioning systems determine the position and moving characteristics of a moving object to be followed. Most of the systems use two methods to accomplish this. One method is a so-called "dead beacon" where multiple reference signals are transmitted at fixed locations and a moving object of interest detects the reference signals to compute its location. Such location information can then be made available to the following object. This is the method used in systems with Loran and GPS. The second method is to permit the moving object to transmit reference signals to the following object. The following object detects the reference signal to find out the position of the object to be followed. To find distance and orientation information, the following object usually has spatially distributed detectors. Signals received by the detectors can be used to compute the distance and orientation by triangulation.

There are several drawbacks to the above-mentioned approaches. The first approach requires the setup of a reference system. As a result, the system is expensive, hard to maintain and the working environment is limited. The GPS and Loran systems offer convenient global position reference, but they do not offer enough accuracy for real-time close following as required in certain applications such as golf carts. The second approach has in itself several drawbacks. First, a reference signal needs to be transmitted continuously from an object to be followed to the following object. This puts a strong restriction on its applications for portable use. Using a golf cart or luggage cart as an example, the object to be followed is a person and the following object is a cart. The person needs to carry a transmitter to send out a strong tracking signal. This transmitter which sends out strong signals has a high power consumption, and therefore would require a prohibitively large battery to energize the transmitter. It is therefore highly impractical to use this method for such applications. Secondly, this method puts a limitation on the use of directional signals (i.e., signals transmitting in small angles, such as infrared signals). This is because the body movement of the carrier may cause detection error. Third, in a multi-cart following case, the following carts may follow the wrong person. Fourth, the method does not offer obstacle detection capability.

Accordingly, it is an object of the present invention to provide an automatic following system which overcomes the above-mentioned drawbacks and disadvantages.

SUMMARY OF THE INVENTION

According to a first aspect of the present invention, an automated object following system includes a tracker associated with a following device, and a guider associated with an object to be followed. The tracker includes a first processor. At least two means for generating an encoded ultrasonic signal are provided, each having a control input communicating with the first processor for emitting an encoded ultrasonic signal generally toward the guider in response to a command signal from the first processor. The encoded ultrasonic signals carry signal source identification information. A radio frequency (RF) receiver communicates with the first processor for receiving from the guider an encoded RF signal carrying its identification and the time the ultrasonic signals were received by the guider for the first processor of the tracker to determine the distance and direction of the guider relative to the tracker for steering the following device toward the guider or object to be followed.

With respect to the guider, an ultrasonic detector detects the ultrasonic signals generated by the ultrasonic means of the tracker. A second processor communicates with the ultrasonic detector for generating its identification and the time the ultrasonic signals were received by the guider. An RF transmitter communicates with the second processor for transmitting the encoded RF signal carrying the identification and time information to the RF receiver of the tracker upon the reception of the ultrasonic signals by the ultrasonic detector.

Preferably, the tracker includes a plurality of infrared (IR) transmitters communicating with the first processor wherein each of the IR transmitters is oriented in a slightly different direction relative to an adjacent IR transmitter for emitting an encoded IR signal carrying source identification information generally toward the guider. The guider preferably includes an IR receiver communicating with the second processor for detecting at least one of the encoded IR signals generated by the IR transmitters. The second processor encodes information relating to its identification and which of the IR signals was detected by the guider in order to be transmitted back to the tracker by means of an encoded RF signal transmitted by the RF transmitter. The encoded RF signals are thus based on the time of reception of the encoded ultrasonic signals, and which of the encoded IR signals were received by the IR receiver such that the RF transmitter transmits the encoded RF signal to the RF receiver of the tracker based on both the information carried by the ultrasonic and IR signals.

Alternatively, instead of encoding an identification, the IR transmitters may transmit its signals in a predetermined sequence known by the tracker and the guider to permit the guider to identify which of the IR signals is received. Determining which of the IR signals is detected by the guider enables the guider to send back this information to the tracker via the encoded RF signal so that the tracker may precisely determine the heading angle of the guider relative to the tracker.

According to a second aspect of the present invention, a method of directing a following device associated with a tracker toward a movable, followed object associated with a guider is provided. At least two encoded ultrasonic signals directed generally toward the guider are generated at the tracker. Each encoded ultrasonic signal originates from a distinct source that is spaced from the other sources, and each encoded ultrasonic signal carries signal source identification information. The encoded ultrasonic signals are received at the guider, and thereupon an encoded RF signal is directed back to the tracker for directing the following device toward the followed object. The encoded RF signal carries its identification and the time the ultrasonic signals were received by the guider so that the tracker can determine the distance and following direction of the guider relative to the tracker for directing the following device toward the tracker or object to be followed.

Preferably, a plurality of encoded infrared (IR) signals are generated at the tracker and are directed generally toward the guider either simultaneously or in a predetermined sequence. Each of the IR signals carries source identification information and is directed in a slightly different direction relative to the other IR signals. The encoded RF signal is generated at the guider and carries its identification and information as to which of the IR signals was received for the tracker to determine the distance and heading angle of the guider relative to the tracker.

The following system and method is preferably employed for such automatic following applications such as auto golf carts and luggage carts under a complex environment.

An advantage of the present invention is that the tracker actively sends the detection signals (preferably both ultrasonic and IR) and the guider passively receives these signals for high accuracy, strong anti-interference ability and low power consumption.

A second advantage is that the guider has an RF transmitter to send out an encoded identification signal to the tracker to avoid a tracker following the wrong guider when several following devices are close together and are employing automatic following systems.

A third advantage is that employing both ultrasonic and IR signals to measure the guider moving direction is a highly reliable direction detection mode.

A fourth advantage is that an obstacle is detected by the ultrasonic transducer of the tracker by receiving a reflective echo from the obstacle in order to automatically stop the vehicle associated with the tracker before the vehicle collides with the obstacle.

A fifth advantage is that the system has a mode for following both the path and pace of the guider which is beneficial for vehicles such as golf carts and luggage carts traveling along a crowded or complex environment.

DETAILED DESCRIPTION OF THE PREFERRED EMBODIMENT

Figure 1:
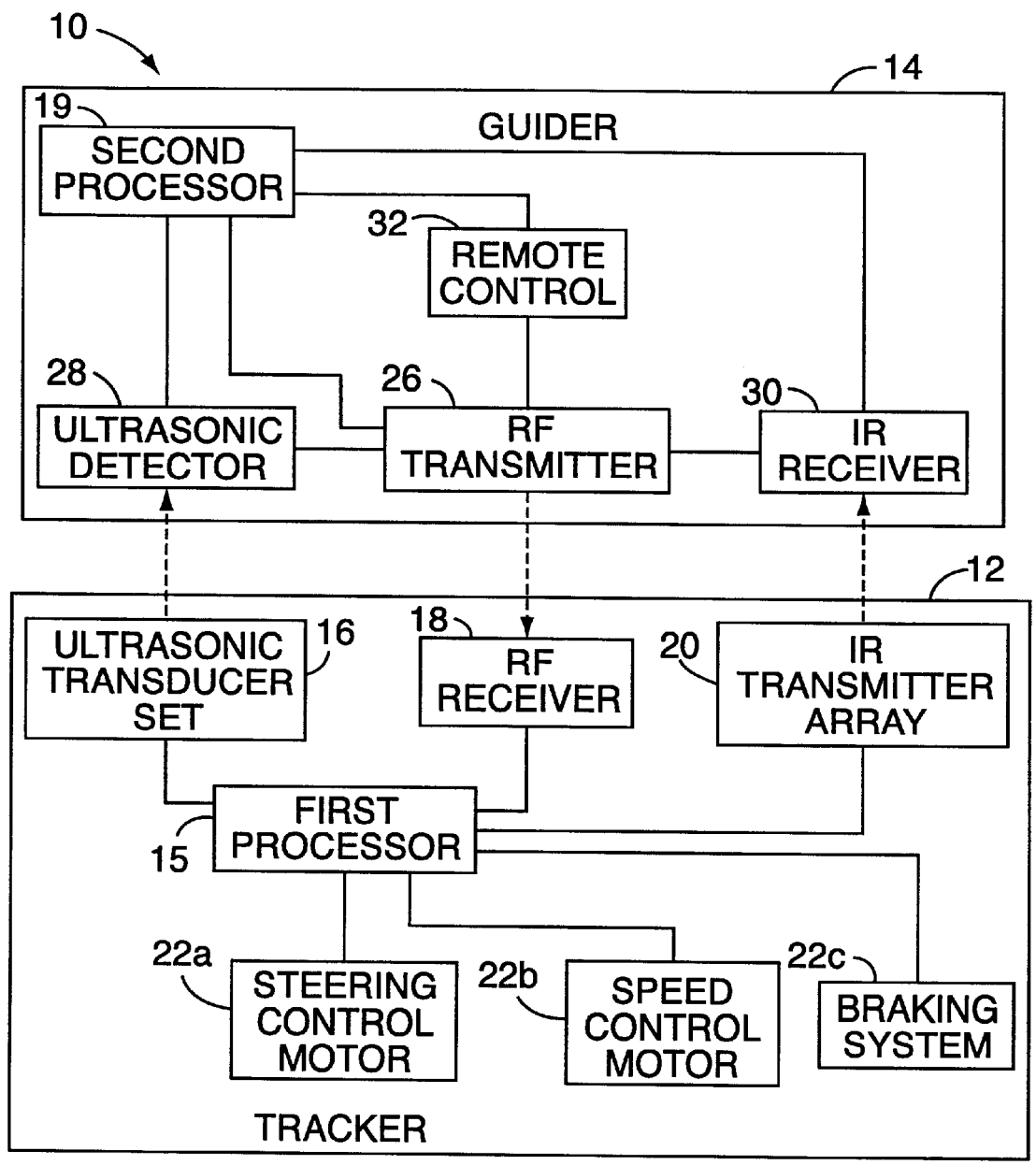
FIG. 1 schematically illustrates an automatic following system embodying the present invention.

With reference to FIG. 1, an automatic following system embodying the present invention is generally designated by the reference number 10. The following system includes a tracker 12 and a guider 14. The tracker 12 includes a first processor 15 having terminals communicating with a plurality of ultrasonic transducers 16, a radio frequency (RF) receiver 18, a plurality of infrared (IR) transmitters 20 and servo control motors 22, including a steering control motor 22a, a speed control motor 22b and a braking system 22c to control the steer and the speed of a following device associated with the following system 10. The guider 14 includes a second processor 19 having terminals communicating with an RF transmitter 26, an ultrasonic detector 28, an IR receiver 30 and a remote controller or remote control logic 32. The ultrasonic detector 28 and the IR receiver 30 of the guider 14 respectively receive ultrasonic signals transmitted by the ultrasonic transducers 16 of the tracker 12 and IR signals transmitted from the IR transmitters 20 of the tracker.

Preferably with respect to the guider 14, the IR receiver 30 and the ultrasonic detector 28 are wide angle and multi-channel for receiving encoded signals carrying identification information so that the guider 14 may decode the signals and consequently reject those signals with unknown identification sent from other trackers in an environment where a plurality of following systems may be employed in close proximity to one another. Also preferably, the RF transmitter 26 is multi-channel for transmitting encoded RF feedback signals and remote control commands to the tracker 12. As will be explained below with respect to FIG. 9, if the decoded ultrasonic and IR signals have identification indicating valid signals are being received by the guider 14, the signals trigger control logic associated with the RF transmitter 26 to transmit the RF feedback signals to the tracker 12. As will be explained with respect to FIG. 9, control logic associated with the RF transmitter 26 also receives input from a keypad interfacing with the remote control logic 32 of the guider 14 in order to control the motion of the tracker from the keypad.

Preferably with respect to the tracker 12, the ultrasonic transducers 16 are wide angle and multi-channel for transmitting encoded detection signals, the IR transmitters 20 are narrow angle and multi-channel for sending out encoded direction detection signals, and the RF receiver 18 is multi-channel for receiving the encoded RF feedback signals and the remote commands from the RF transmitter 26.

Figure 2:
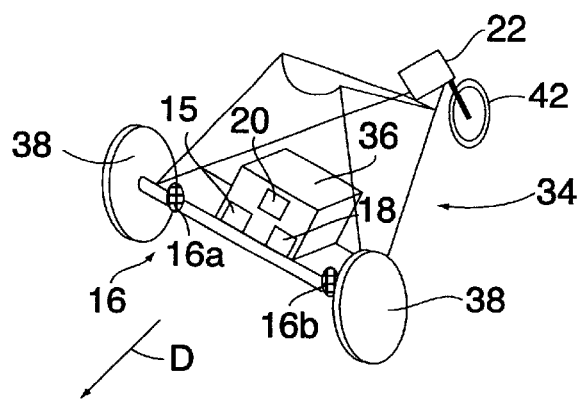
FIG. 2 schematically illustrates a tracker of the automatic following system for guiding a golf cart.

FIG. 2 schematically illustrates the employment of the tracker 12 on a moving vehicle such as, for example, a fully automatic, following golf cart 34 generally having a following direction as shown by the arrow D. The golf cart 34 includes a main control system 36 for housing or supporting the first processor 15, the IR transmitters 20 and the RF receiver 18. The plurality of ultrasonic transducers 16 are preferably two ultrasonic transducers 16a and 16b spaced from each other and beside an associated front wheel 38 of the golf cart 34. The servo control motors 22 communicate with the first processor 15 in the main control system 36 for controllably steering a rear steering wheel 42 of the golf cart 34 to guide the golf cart 34 toward the guider 14 at a selected speed.

Figure 3:
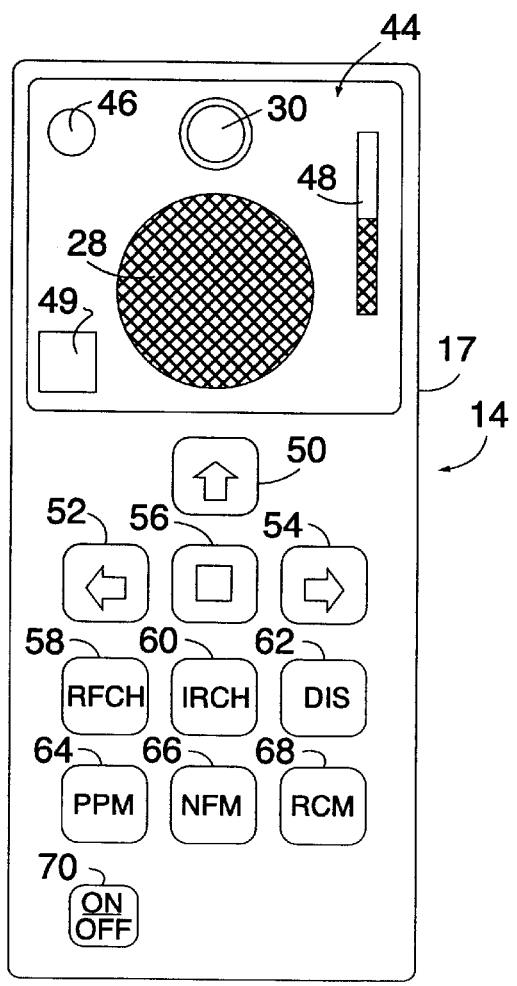
FIG. 3 shows a guider of the automatic following system as a hand-held unit.

FIG. 3 illustrates, as an example, the guider 14 embodied as an interactive keyboard interface 17 that may be clipped to the followed object, such as to the back of a golfer. An upper panel 44 of the guider 14 includes a power-on indicator 46, a battery indicator 48 for visually indicating the amount of remaining power available from an internal battery (not shown), a warning indicator 49, such as an audible alarm or other means for warning such as a light or vibrator mechanism, for being activated upon an alarm condition such as loss of tracker signal, the ultrasonic detector 28 and the IR receiver 30. The lower portion of the unit includes a keypad having a plurality of buttons serving as an interface with the remote control 32 of the guider 14 for remotely controlling the vehicle associated with the tracker 12. More specifically, the buttons incrementally control the direction of the vehicle associated with the tracker 12 as indicated by the buttons. A forward direction or go button 50 to control the tracker 12 to move the following device forwardly, a left direction button 52 to control the tracker to turn the following device leftwardly, a right direction button 54 to control the tracker to turn the following device rightwardly, and a stop button 56 to control the tracker to stop the following device may be pressed to override an automatic following feature of the tracker 12. The forward button 50 is pressed for controlling the tracker 12 to move the following device not only forwardly, but also to incrementally increase the forward speed of the following device upon each press of the forward button.

The guider 14 further includes buttons for performing a variety of operations that are transmitted to the tracker 12 via the RF transmitter 26. The RF signals are encoded by an encoder (see FIG. 9) so that the first processor 15 distinguishes the signals from each other upon decoding the RF signals as well as recognizes which signals come from an identifiable guider (see FIG. 8). As shown in FIG. 3, an RFCH button 58 is pressed to adjust the frequency channel of the RF feedback signal, an IRCH button 60 is pressed to adjust the frequency channel of the IR signal transmitted from the tracker 12 to the guider 14, a DIS button 62 is pressed to adjust the following distance of the tracker 12, a PPM button 64 is pressed to activate a pace-path following control mode, an NFM button 66 is pressed to activate a normal following control mode, an RCM button 68 is pressed to activate a remote control mode, and an ON/OFF button 70 is pressed to toggle the following system 10 between on and off states.

Figure 4:
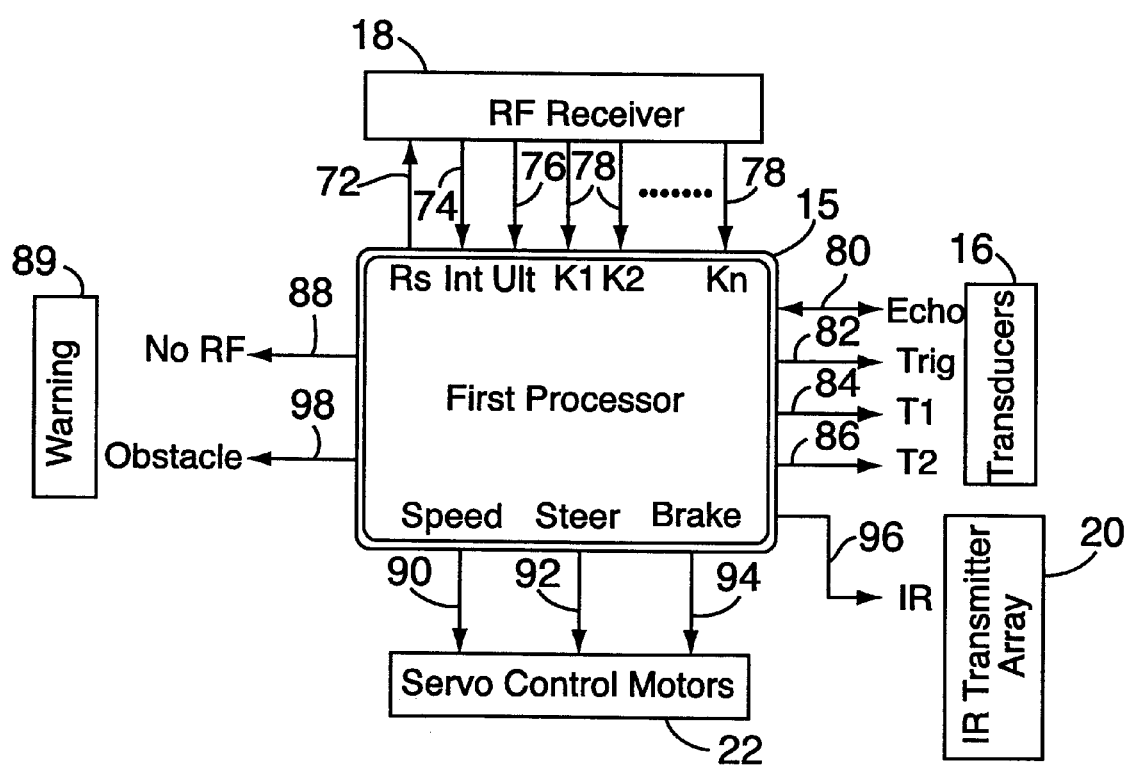
FIG. 4 schematically shows in greater detail the tracker of the automatic following system of FIG. 1.

FIG. 4 illustrates the tracker 12 in greater detail. The first processor 15 is preferably an embedded system with a low-cost microcontroller. The microcontroller has the following capabilities: watch-dog timer, pulse width modulation (PWM) generation for motor control, external interrupts, and digital input/output. The first processor 15 serves as a central processing unit to determine the following system operation mode, compute following distance and direction, and interact with the ultrasonic transducers 16, the IR transmitters 20, the RF receiver 18 and the servo control motors 22. As shown in FIG. 4, the first processor 15 has the following terminals or interface connections:

Rs—for resetting the RF receiver 18 via line 72,

Int—for receiving an interrupt signal from the RF receiver 18 via line 74 to indicate the arrival of a signal at the RF receiver, Ult—for receiving a signal detection signal via line 76 indicating that the RF receiver 18 has received an RF signal from the RF transmitter 26, K1, K2, . . . , Kn—for receiving via lines 78, 78 control signals transmitted from the RF transmitter 26 and detected by the RF receiver 18, Echo—for receiving via line 80 an ultrasonic signal echoed back to the ultrasonic transducers 16 from an obstacle interposed between the tracker 12 and the guider 14 to automatically stop the following device controlled by the tracker 12, Trig—for sending via line 82 a trigger signal to the ultrasonic transducers 16, T1, T2—for sending via lines 84, 86 ultrasonic transducer selection signals with servo control, No RF—for sending via line 88 a signal to trigger a warning indicator 89, such as an audible alarm, light or vibrating mechanism, on the tracker 12 when no RF feedback signal is received from the guider 14, Speed—for sending via line 90 a vehicle speed control signal to the servo control 22, Steer—for sending via line 92 a vehicle steering control signal to the servo control motors 22, Brake—for sending via line 94 a vehicle braking control signal to the servo control motors 22, IR—for sending via line 96 an infrared signal to the IR transmitters 20, and Obstacle—for sending via line 98 a signal to trigger the warning indicator 89 when ultrasonic signals are echoed back to the tracker 12 from an obstacle interposed between the tracker 12 and the guider 14.

The servo control motors 22 are conventional motors for employing speed control, steering control and brake control. The speed control employs a conventional pulse width modulation (PWM) motor control circuit. The steering control is position control, and may also be a PWM motor control with position feedback. The brake control employs a solenoid to apply braking force on a rotor of the speed control motor 22b.

Figure 5:
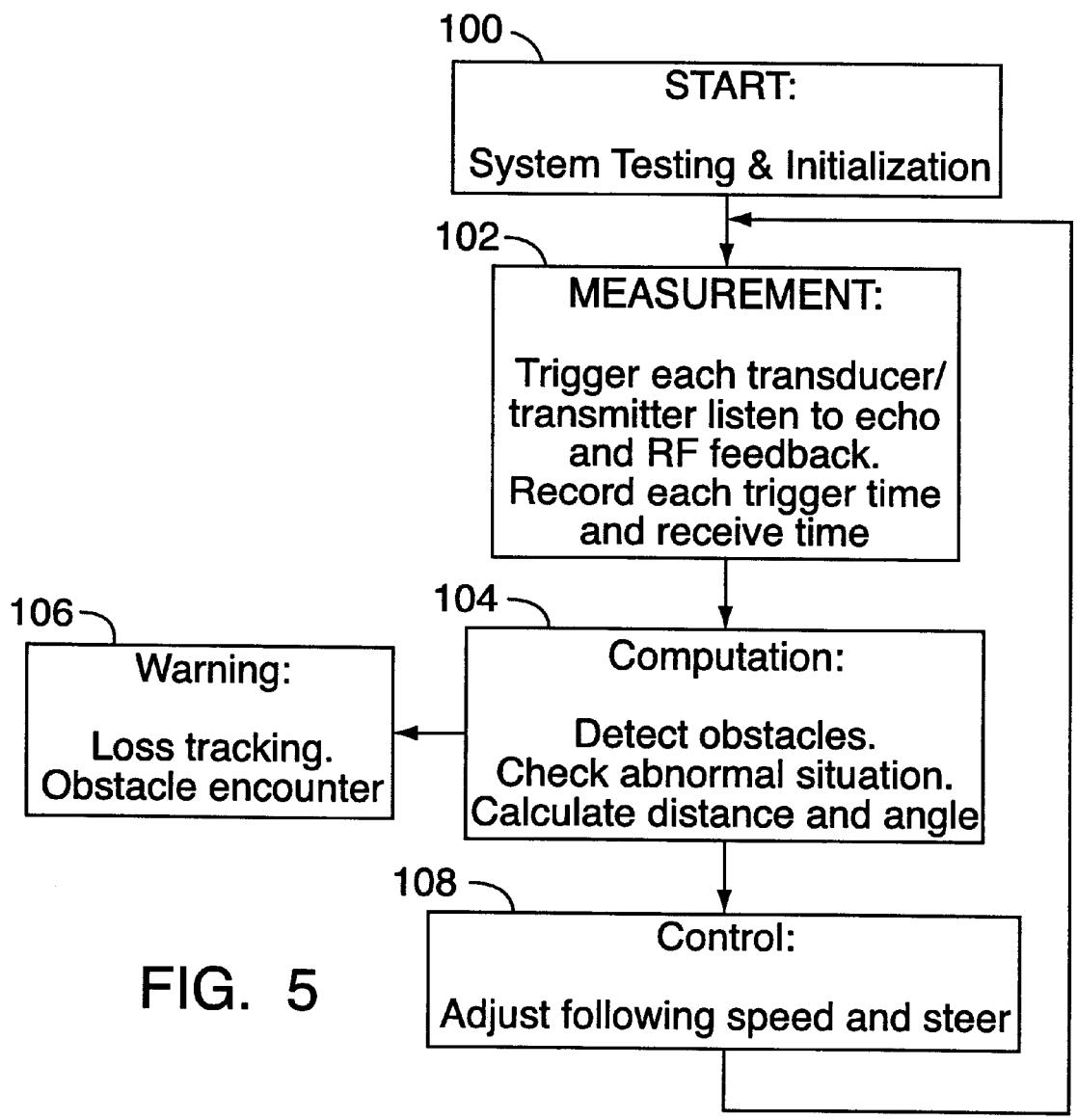
FIG. 5 is a flow chart illustrating the operation of the automatic following system of FIG. 1.

FIG. 5 is a simplified flow chart illustrating the operation of the automatic following system 10. At start block 100, the first processor 15 of the tracker 12 performs a system testing and initialization routine. At measurement block 102, the first processor 15 activates the ultrasonic transducers 16 and the IR transmitters 20 of the tracker to transmit respectively encoded ultrasonic and encoded IR signals to the guider 14. Each of the ultrasonic transducers 16 may send out ultrasonic signals which are encoded differently from each other, and each of the IR transmitters 20 may send out IR signals which are encoded differently from each other in order to indicate, for example, the time the signals were transmitted and to identify which of the ultrasonic transducers and the IR transmitters generated the signals received by the guider 14.

The RF feedback signal generated by the RF transmitter 26 of the guider 14 is encoded to carry its identification and the time the ultrasonic signals was received by the guider 14 as well as which of the directional IR signals was received by the guider. For instance, the length of time in which the ultrasonic signals travel from the tracker 12 to the guider 14 determines the distance between the tracker and the guider. Also, the length of time it takes each of the ultrasonic signals generated from each of the ultrasonic transducers 16 to reach the guider 14 roughly determines the positional angle of the guider relative to the tracker 12. Further, the determination of which of the IR transmitters 20 has generated an IR signal received by the guider 14 more precisely determines the positional angle of the guider relative to the tracker 12. The RF transmitter 26 of the guider 14 will then transmit the encoded RF feedback signal to the tracker 12 upon reception of both ultrasonic signals and IR signals with the identification, distance and angle information. The RF feedback signal may also be encoded to carry remote control signals input at the guider 14 as was explained with respect to FIG. 3.

The RF transmitter 26 of the guider 14, however, will not send an RF feedback signal if it receives ultrasonic signals, but does not receive infrared signals. This situation may occur when an obstacle is interposed between the tracker 12 and the guider 14 which blocks the narrowly angled IR signals, but does not block the more relatively wider angled ultrasonic signals. Further, the RF transmitter 26 will not send an RF feedback signal to the tracker 14 if it does not receive any signals from the tracker 12. This situation may occur when the guider 14 is out of communication range of the tracker 12, when the guider is outside of the angle range of the IR signal, or when the tracker 12 is malfunctioning. The ultrasonic transducers 16 are also alerted to be receptive to any ultrasonic signal echoes reflected back to the tracker 12 from an obstacle interposed between the tracker 12 and the guider 14. The received reflected signal from the object in the beam field is used calculate the distance of obstacles. If the calculation from the reflected or echo signal matches the calculation from the RF signal of the guider 14, the object detected is the guider. Otherwise, the mismatch leads to the detection of obstacles in the beam field. The RF receiver 18 is also triggered to detect an encoded RF feedback signal originating from the RF transmitter 26.

At computation block 104, the first processor 15 of the tracker 12 upon detecting any obstacles will send an obstacle signal to trigger a warning indicator on the tracker 12 (warning block 106), or upon receiving no RF feedback signal from the guider 14, will send a "no RF" or loss of tracking signal to trigger the warning indicator (warning block 106). A corresponding warning indicator 49 on the guider 14 also may be triggered when no ultrasonic and IR signals are received (loss of tracking) or only an IR signal, but no ultrasonic signal is received (obstacle encountered). Further, at computation block 104, the first processor 15 of the tracker 12 will calculate the distance and angle for steering the following vehicle directed by the tracker 12 based on the information carried on the encoded RF feedback signal (to be explained more fully with respect to FIGS. 7 and 10). At control block 108 the first processor 15 adjusts following speed and steering to the servo control motors 22 in response to the calculated positional information.

Figure 6:
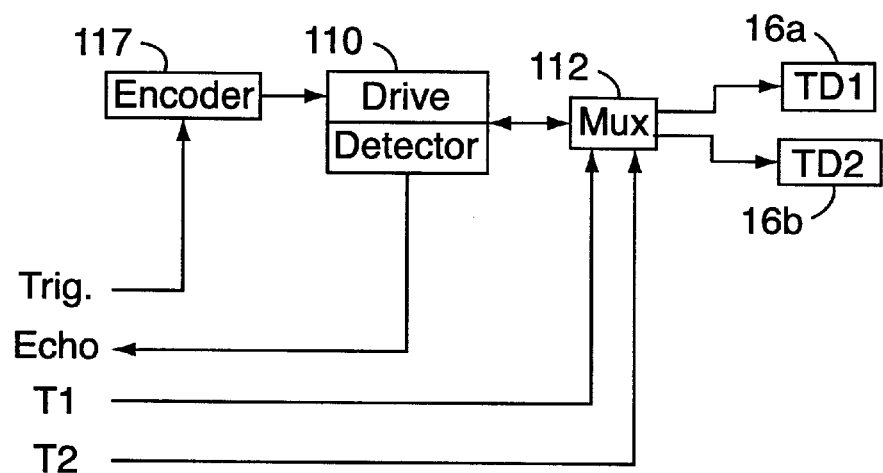
FIG. 6 schematically shows in greater detail the ultrasonic transducers forming part of the tracker.

FIG. 6 schematically shows in greater detail the structure for encoding and receiving ultrasonic signals. A signal driver and a detector circuit 110 interfaces with two wide-angle ultrasonic transducers 16a and 16b. The first processor 15 of the tracker 12 (not shown) selects one of the transducers 16a and 16b via lines T1 and T2 to control a multiplexer 112 which connects the driver/detector circuit 110 to the selected ultrasonic transducer. Then the first processor 15 sends the trigger signal to the selected ultrasonic transducer via line Trig. The trigger signal activates a programmable encoder 114 to send an encoded series of pulses to the driver/detector circuit 110. The driver/detector circuit 110 powers the selected ultrasonic transducer to transmit a series of pulses to the guider 14. Once the transmission process ends, the driver/detector circuit 110 detects any echoes reflected from an object on the effective field and received by the selected ultrasonic transducer. If a valid echo is detected, an echo signal is send back to the first processor 15 via a line "Echo" to indicate the presence of an obstacle. In response to receiving an echo signal, the first processor 15 sends a brake signal to the servo control 22 via the line 94 (see FIG. 4). The encoder 114 is employed to make the ultrasonic signals transmitted from one following vehicle different from another following vehicle (i.e., each tracker associated with a following vehicle has its own identification) to thereby reduce interference among several following vehicles in close proximity to each other.

Figure 7:
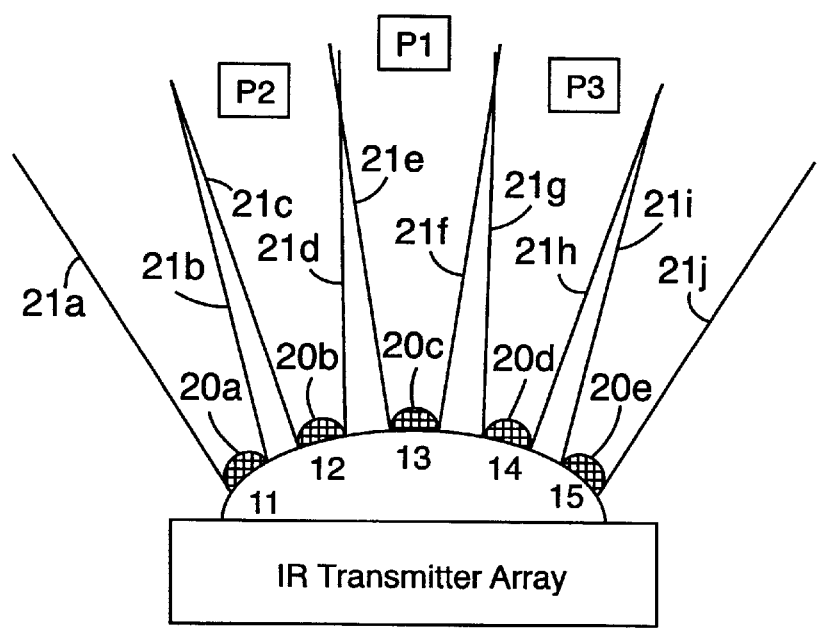
FIG. 7 schematically shows a plurality of IT transducers forming part of the tracker.

FIG. 7 schematically illustrates in greater detail the plurality of directional IR transmitters installed in front of the tracker 12. For example, five (5) narrow-angle IR transmitters 20a, 20b, 20c, 20d and 20e are shown in FIG. 7. IR signals are encoded and transmitted from each transmitter to the guider 14. The guider 14 will send the RF feedback to the tracker 12 to show which transmitter's signal was detected by the guider. The first processor 15 will use this information to evaluate the following direction. As shown in FIG. 7, the IR transmitters 20 are mounted on an arcuate surface so that each IR transmitter 20 is oriented in a slightly different direction relative to an adjacent IR transmitter, whereby each IR transmitter transmits IR signals within an angle range that is different from the other IR transmitters. The angle range of the IR transmitter 20a is illustrated as being between boundary lines 21a and 21b; the angle range of the IR transmitter 20b is illustrated as being between boundary lines 21c and 21d; the angle range of the IR transmitter 20c is illustrated as being between boundary lines 21e and 21f; the angle range of the IR transmitter 20d is illustrated as being between boundary lines 2g and 21h, and the angle range of the IR transmitter 20e is illustrated as being between boundary lines 21i and 21j.

Figure 8:
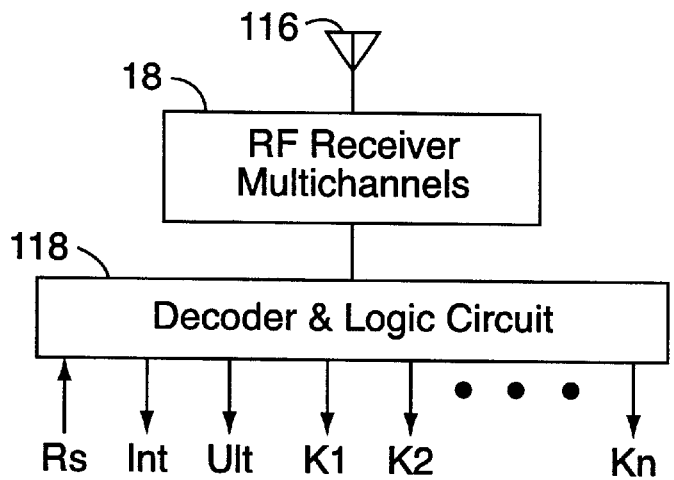
FIG. 8 schematically shows in greater detail the RF receiver forming part of the tracker.

FIG. 8 illustrates in greater detail the RF receiver 18 and associated circuitry. An antenna is coupled to an input of the RF receiver 18 for receiving RF signals from the RF transmitter 26 of the guider 14. A decoder and logic circuit 118 is interposed between the RF receiver 18 and the first processor 15 (see FIG. 4) for decoding the encoded RF signals to thereby identify and receive those RF signals which come from its associated guider 14 and to also reject unwanted RF signals originating from other guiders in an environment where a plurality of following systems may be employed. Preferably, the multi-channel RF receiver 18 is in constant receiving mode. Rejection of unwanted RF signals is a concern since the RF transmission range is significantly larger than the IR and ultrasonic signals.

Figure 9:
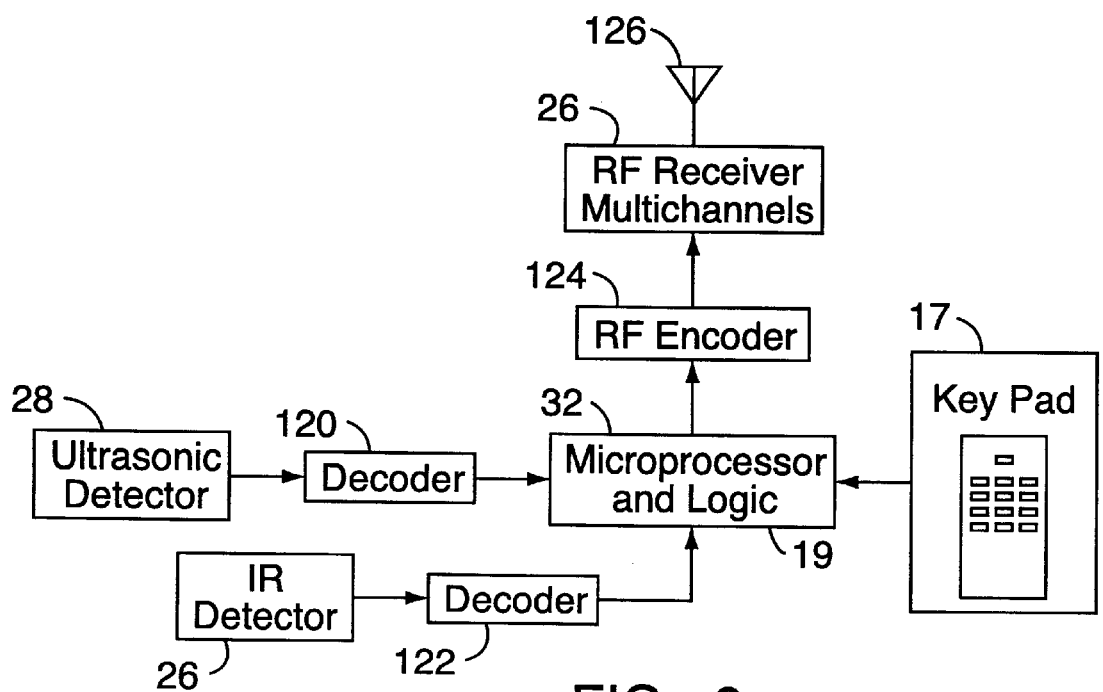
FIG. 9 schematically shows in greater detail the guider of the automatic following system of FIG. 1.

FIG. 9 illustrates in greater detail the guider 12 of the automatic following system 10. The ultrasonic detector 28 and the IR detector 20 have output terminals respectively coupled to decoders 120 and 122 for decoding the encoded ultrasonic and IR signals. The decoders 120, 122 and the keyboard interface 17 of the guider 14 have output terminals coupled to the second processor 19 and the remote control logic 32 for generating RF feedback signals in response to receiving the ultrasonic signals and the IR signals, and in response to receiving the command signals input at the keyboard interface 17. The remote control logic 32 has an output terminal coupled to an RF encoder 124 for encoding the RF feedback signal so that the associated tracker 12 may identify and receive those RF signals coming from its associated guider 14 and also to reject unwanted RF signals originating from other guiders in an environment where a plurality of following systems may be employed. The encoded RF signal is then transmitted to its associated guider 14 via the RF transmitter 26 and antenna 126.

Figure 10:
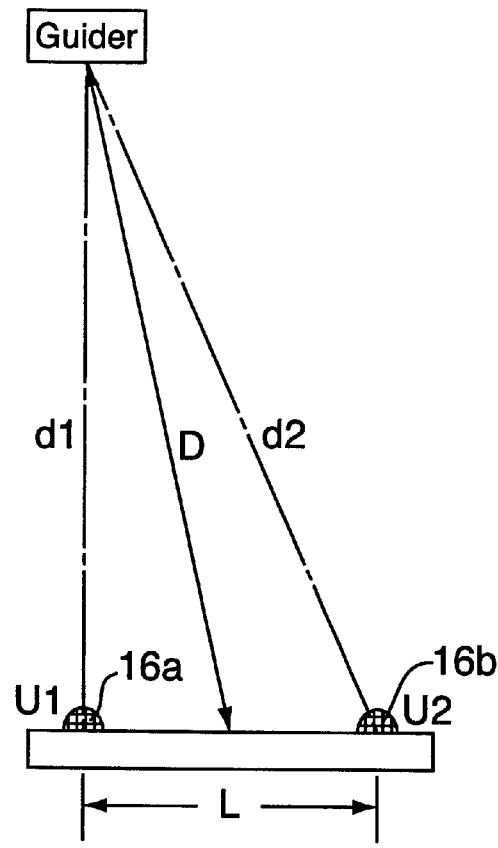
FIG. 10 shows the positional relationship of two ultrasonic transducers with respect to the guider for determining following distance measurement.

FIG. 10 shows the positional relationship of two ultrasonic transducers 16a and 16b with respect to an associated guider 14 for determining a following distance measurement. The two ultrasonic transducers 16a and 16b are located at the front of the tracker 12 and spaced at a distance "L" from one another as shown in FIG. 10. As an example of operation, the first processor 15 (see FIG. 1) sets the ultrasonic transducers 16a and 16b to a transmit mode such that the transducer 16a transmits an encoded ultrasonic signal E1, and the ultrasonic transducer 16b simultaneously transmits an encoded ultrasonic signal E2. The first processor 15 defines the time when the signals E1 and E2 are transmitted as time $t_0$. Then, the first processor 15 sets the ultrasonic transducers 16a and 16b to a receiving mode to receive any echoes from an obstacle which might be interposed between the tracker 12 and the guider 14. Upon reception of the signal E1 by the ultrasonic detector 28 of the guider 14, the guider 14 transmits an encoded RF feedback signal to the tracker 12 carrying a time $t_1$ when the guider 14 received the ultrasonic signal E1. Similarly, upon reception of the signal E2 by the ultrasonic detector 28 of the guider 14, the guider transmits an encoded RF feedback signal to the tracker 12 carrying a time $t_2$ when the guider 14 received the ultrasonic signal E2. The first processor 15 records the time $t_1$ when the ultrasonic signal E1 is received by the guider 14 and the time $t_2$ when the ultrasonic signal E2 is received by the guider. The time difference between $t_0$ and $t_1$ is used by the first processor 15 to compute the distance d1 from the ultrasonic transducer 16a to the guider 14. The time difference between $t_0$ and $t_2$ is used by the processor 15 to compute the distance d2 from the ultrasonic transducer 16b to the guider 14. Finally, the distance "D" between the tracker 12 and the guider 14 is computed from d1 and d2 using known triangulation or hybrid triangulation computational algorithms.

Alternatively, the ultrasonic transducers 16a, 16b may be turned on and off by the first processor 15 on at a time according to a predetermined sequence known by the tracker 12 and the guider 14 to identify which of the ultrasonic transducers is the source of the signal received by the guider.

Referring again to FIG. 7, the employment of IR direction detection will be explained. IR direction detection complements and improves the accuracy of direction detection otherwise based on the employment of ultrasonic signals alone. One reason for improved accuracy is that the IR signals have smaller angle orientations relative to the ultrasonic signals for precise orientation measurements. Further, IR signals—unlike ultrasonic signals—are not as prone to being distorted because of weather conditions such as varying air temperature and humidity.

The IR transmitters 20a–20e which are the source of the IR signals may be identified by an identifier carried by the encoded IR signals. Alternatively, the IR transmitters 20a–20e which are the source of the IR signals may be turned on and off by the first processor 15 one at a time in a predetermined sequence known by the tracker 12 and the guider 14. The encoded RF signal transmitted to the tracker 12 may carry as information the time one or more of the IR signals was received by the guider 14 to identify which IR signals was received and thereby enable the first processor 15 of the tracker 12 to compute the following angle.

If the guider 14 is at position P1, the guider will only receive an IR detection signal originating from the IR transmitter 20c, and in response transmit an encoded RF feedback signal to the tracker 12. There will be no RF feedback signal transmitted for the IR detection signals emanating from the IR transmitters 20a, 20b, 20d and 20e. The first processor 15 then determines that the position of the guider 14 is at the middle position P1. If the guider 14 is at position P2, the guider will only receive an IR detection signal originating from the IR transmitter 20b, and in response transmit an encoded RF feedback signal to the tracker 12. There will be no RF feedback signal transmitted for the IR detection signals emanating from the ultrasonic transducers 20a, 20c, 20d and 20e. The processor 15 then determines that the position of the guider 14 is at the left position P2. If the guider 14 is at position P3, the guider will only receive an IR detection signal originating from the IR transmitter 20d, and in response transmit an encoded RF feedback signal to the tracker 12. There will be no RF feedback signal transmitted for the IR detection signals emanating from the ultrasonic transducers 20a, 20b, 20c and 20e. The processor 15 then determines that the position of the guider 14 is at the right position P3. If the guider 14 is at an overlapping area, the guider will receive two IR detection signals originating from adjacent ultrasonic transducers 16, 16 covering the overlapping area. Consequently, the processor 15 will receive two encoded RF feedback signals corresponding to the two received IR detection signals. Therefore, the guider 14 position can also be determined.

Since multiple following devices might be employed in close proximity to each other, it is necessary to eliminate interference among the following devices, such as golf carts, and from the external environment. Otherwise signals of one following system may be received and acted upon by another following system, thereby causing following systems to track the wrong guider. As mentioned previously, one way to reduce interference is to use signal encoding.

There are three kinds of signals transmitted between the tracker 12 and the guider 14: ultrasonic signals, IR signals and RF signals. All of these signals should be encoded so that each following system has its own signal pattern.

Figure 11:
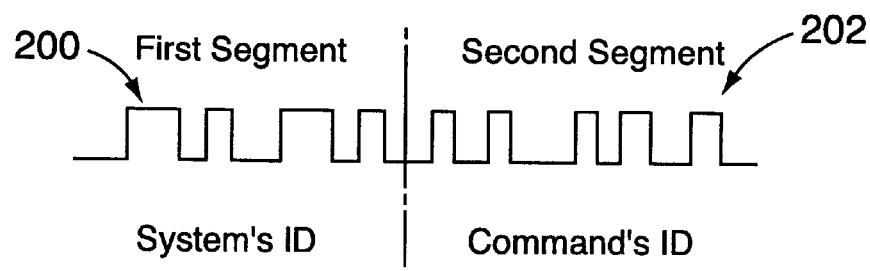
FIG. 11 is a signal diagram illustrating RF signal encoding.

Preferably, RF signals should have an effective working range over one hundred feet and have a frequency within commercial FCC ranges such as, for example, around 29 MHz or 900 MHz. Although a multi-channel RF transmitter 26 and RF receiver 18 are employed, it is such multi-channel systems that are more likely to interfere with other such systems during RF signal transmission. Therefore, encoding RF signals is more important than encoding the detection signals. Further, multiple RF command signals need to be transmitted from the guider 14 to the tracker 12 via an RF feedback signal. Different commands need to be distinguished from one another by encoding. A way to address the two encoding requirements is to employ two stage encoding, that is, to encode the RF feedback signal in two segments as shown by way of example in FIG. 11. A first segment 200 of four pulses is unique for a following system 10, and a second segment 202 of five pulses identifies different commands. The RF receiver 18 needs to decode the encoded RF signal at two stages. The first stage is to decode the first segment to identify if the received RF signal is coming from the associated guider 14. If so, then the second segment of the RF signal is decoded to determine the command transmitted by the RF signal.

The ultrasonic signals of the following system 10 should be effective in a range of about 30 feet. Interference will take place when two or more following systems are close to each other. To avoid interference, the programmable encoder 114 is employed to encode the ultrasonic signal into a series of pulses (see FIG. 6). Each following system 10 is programmable to transmit a distinguishing pulse train so that an RF receiver 18 only recognizes the pulse train of an RF signal transmitted from its associated guider 14. All of the ultrasonic transducers 16 of the same following system 10 will have the same encoding pulse train. However, ultrasonic pulses of different frequencies can be used at the same time, and thus the system can receive distance measurement of multiple transducers simultaneously. Interference might still occur, however, if an ultrasonic detector were to receive ultrasonic signals from two different sources at the same time so as to cause the signal to be lost.

For IR signal encoding, pulse codes unique to each of the plurality of IR transmitter may be set by the first processor 15 of the tracker 12 in response to the command signals transmitted from the guider 14. The pulse codes of each of the IR transmitters 20 may be made distinguishable from each other by varying the frequency of the pulses among the IR transmitters.

The ultrasonic transducers 16 will turn to a receiving mode after sending out the IR detection signals. More specifically, the ultrasonic transducers 16 wait for the detection of any ultrasonic signals echoed back from obstacles interposed between the tracker 12 and the guider 14. If such echo signals are received, the first processor 15 will analyze these signals and compare them with the information of the RF feedback signals from the guider 14. The first processor 15 will stop the following device controlled by the tracker 12 and send out a warning signal to the tracker 12 and the guider 14 if the processor 15 has determined that an obstacle is impeding the path of the following device controlled by the tracker. The person associated with the guider 14 may then use the keyboard interface 17 of the guider to manually inform the tracker 12 of the path to be followed by the following device in order to avoid the obstacle.

Normal following mode (NFM) is a direction following control mechanism. In this mode, the tracker 12 controls the speed of the following device 34 to keep a constant distance from the guider 14 based on the current distance measurement. Meanwhile, the tracker 12 adjusts the device following direction towards the guider 14 based on the current direction measurement. As an example, let D[n] be the distance measurement at time n, and R[n] be the direction measurement of the guider 14 relative to the tracker 12. In the NFM mode, the desired speed V[n] and desired steering S[n] of the tracker 12 will be direct functions of D[n] and R[n], that is, V[n]=f(D[n]), S[n]=g(R[n]). The desired following distance is preset and can be adjusted by the user anytime. In NFM mode, the tracker 12 might not follow the same path as the guider 14. When the guider 14 moves on a curve, the tracker 12 may usually take a "short cut" to follow the guider. This short cut feature is satisfactory if the following distance is close because the deviation from the actual path taken by the guider is small.

A pace-path following control mode (PPM) follows the path of the guider 14 at a preset constant distance. In other words, the tracker 12 tries to go through the same path trajectory as the guider 14. As an example, a control algorithm of the first processor 15 performs the following operation for pace-path mode. Assume that the guider 14 goes through the following trajectory from time m to time n:

$Pg[m], Pg[m+1], \ldots Pg[n-1], Pg[n].$

At each position, the measured velocity and orientation is as follows:

$(Vg[m], Rg[m]), (Vg[m+1], Rg[m+1]), \ldots (Vg[n-1], Rg[n-1]), (Vg[n], Rg[n])$ where V[i] is the measured velocity, and R[i] is the measured direction at time i. The current time instance is n. Suppose the tracker 12 is at point Pt[n], which is the same point of Pg(k). In other words, the guider 14 had passed the same point at time k. To follow the same path as the guider 14, the desired performance of the tracker 12 at time n is to duplicate the behavior of the Guider at time k, that is, $Vt[n]=Vg[k]$ $Rt[n]=Rg[k]$ Although this invention has been shown and described with respect to exemplary embodiments thereof, it should be understood by those skilled in the art that the foregoing and various other changes, omissions, and additions in the form and detail thereof may be made therein without departing from the spirit and scope of the invention. Accordingly, the present invention has been shown and described by way of illustration rather than limitation.

What is claimed is:

1. An automated object following system comprising:

a tracker associated with a following device, and a guider associated with an object to be followed;

the tracker including:

a first processor for determining the distance and direction between the tracker and the guider;

at least two means for generating an encoded ultrasonic signal each having a control input communicating with the first processor for emitting an encoded ultrasonic signal generally toward the guider in response to a command signal from the first processor, the encoded ultrasonic signals carrying signal source identification and timing information, the signal source identification and timing information for enabling the guider to determine which generating means initiated the ultrasonic signals; and a radio frequency (RF) receiver communicating with the first processor for receiving from the guider an encoded RF signal carrying information for the first processor to determine the distance and direction of the guider relative to the tracker for steering the following vehicle based on the time difference between transmitting the ultrasonic signal and receiving an RF signal at the tracker; and the guider including:

an ultrasonic detector for detecting the encoded ultrasonic signals generated by the ultrasonic means of the tracker;

a second processor communicating with the ultrasonic detector for encoding information to be carried by an RF signal to the tracker and based on the encoded ultrasonic signals for the tracker to determine the distance and direction of the guider relative to the tracker; and an RF transmitter communicating with the second processor for transmitting the encoded RF signal to the RF receiver of the tracker upon receiving the encoded ultrasonic signal from the guider.

2. An automated object following system as defined in claim 1, wherein the tracker further includes a plurality of infrared (IR) transmitters communicating with the first processor, each of the IR transmitters oriented in a slightly different direction relative to an adjacent IR transmitter for emitting an encoded IR signal carrying source identification information generally toward the guider, and wherein the guider further includes an IR receiver communicating with the second processor for detecting at least one of the encoded IR signals generated by the IR transmitters, the encoded RF signal carrying information based on the encoded ultrasonic signals and which of the encoded IR signals were received by the IR receiver.

3. An automated object following system as defined in claim 2, wherein the RF transmitter only generates an RF signal upon reception of both ultrasonic and IR signals.

4. An automated object following system as defined in claim 1, wherein at least one of the tracker and the guider includes a warning indicator for being triggered when no RF signal is generated because of a loss of tracking condition or other malfunction.

5. An automated object following system as defined in claim 1, wherein each of the means for generating an encoded ultrasonic signal is an ultrasonic transducer.

6. An automated object following system as defined in claim 5, wherein each of the ultrasonic transducers is receptive to echoes or ultrasonic signals reflected back to the tracker from an obstacle interposed between the tracker and the guider, and wherein the tracker includes a warning indicator coupled to the first processor for being triggered upon reception of echoes.

7. An automated object following system as defined in claim 1, wherein the guider includes means for inputting remote control commands to be carried by the encoded RF signal for manually controlling the tracker.

8. An automated object following system as defined in claim 1, wherein the guider includes means selecting an operational mode of the tracker to be transmitted as a command signal on the encoded RF signal, the operational modes including a constant distance following mode, a same path and pace following mode, and a manual steering mode.

9. An automated object following system comprising:
a tracker associated with a following device, and a guider associated with an object to be followed;
the tracker including:
a first processor;
at least two means for generating an encoded ultrasonic signal each having a control input communicating with the first processor for emitting an encoded ultrasonic signal generally toward the guider in response to a command signal from the first processor, the encoded ultrasonic signals carrying signal source identification and timing information;
a plurality of infrared (IR) transmitters communicating with the first processor, each of the IR transmitters oriented in a slightly different direction relative to an adjacent IR transmitter for emitting an encoded IR signal carrying source identification information generally toward the guider; and
a radio frequency (RF) receiver communicating with the first processor for receiving from the guider an encoded RF signal carrying information based on the ultrasonic signals and which of the IR signals is received by the guider to determine the distance and direction of the guider relative to the tracker for steering the following device; and
the guider including:
an ultrasonic detector for detecting the ultrasonic signals generated by the ultrasonic means of the tracker;
an IR receiver for detecting at least one of the encoded IR signals generated by the IR transmitters;
a second processor communicating with the ultrasonic detector and the IR receiver encoding information to be carried by an RF signal to the tracker and based on the ultrasonic signals and which of the IR signals is received by the guider for the tracker to determine the distance and direction of the guider relative to the tracker; and
an RF transmitter communicating with the second processor for transmitting the encoded RF signal to the RF receiver of the tracker.

10. An automated object following system as defined in claim 9, wherein the RF transmitter only generates an RF signal upon reception of both ultrasonic and IR signals.

11. An automated object following system as defined in claim 9, wherein at least one of the tracker and the guider includes a warning indicator for being triggered when no RF signal is generated because of a loss of tracking condition or other malfunction.

12. An automated object following system as defined in claim 9, wherein each of the means for generating an encoded ultrasonic signal is an ultrasonic transducer.

13. An automated object following system as defined in claim 12, wherein each of the ultrasonic transducers is receptive to echoes or ultrasonic signals reflected back to the tracker from an obstacle interposed between the tracker and the guider, and wherein the tracker includes a warning indicator coupled to the first processor for being triggered upon reception of echoes.

14. An automated object following system as defined in claim 9, wherein the guider includes means for inputting remote control commands to be carried by the encoded RF signal for manually controlling the tracker.

15. A method of directing a following device associated with a tracker toward a movable, followed object associated with a guider, comprising the steps of:
generating at the tracker at least two encoded ultrasonic signals directed generally toward the guider, each encoded ultrasonic signal originating from distinct sources spaced from each other, and each encoded ultrasonic signal carrying signal source identification and timing information, the signal source identification and timing information for enabling the guider to determine which of the distinct sources initiated the ultrasonic signals;
receiving at the guider the encoded ultrasonic signals, and generating thereupon an encoded RF signal back to the tracker for directing the following device toward the followed object; and
determining at the tracker the position of the guider relative to the tracker based on the time between transmitting the ultrasonic signals and receiving the RF signals at the tracker.

16. A method as defined in claim 15, wherein the step of generating the at least two encoded ultrasonic signals includes generating each signal one at a time in a predetermined sequence known by the tracker and the guider in order to permit the guider to determine the source of a received ultrasonic signal.

17. A method as defined in claim 15, further including the steps of:
generating at the tracker a plurality of encoded infrared (IR) signals generally toward the guider, each of the IR signals carrying source identification information and being directed in slightly different direction relative to the other IR signals;

receiving at the guider the encoded IR signals; and wherein the step of generating the encoded RF signal includes carrying distance and direction information of the followed object relative to the following device based on the information carried by the ultrasonic signals and based on which of the IR signals is received at the guider.

18. A method as defined in claim 17, wherein the step of generating the plurality of IR signals includes generating each signal one at a time in a predetermined sequence known by the tracker and the guider in order to permit the guider to determine the source of a received IR signal.

19. A method as defined in claim 17, wherein the step of generating the encoded RF signal is only in response to receiving both ultrasonic and IR signals.

20. A method as defined in claim 15, further including the step of triggering a warning condition from at least one of the tracker and the guider when no RF signal is generated because of a loss of tracking condition or other malfunction.

21. A method as defined in claim 15, further including the steps of detecting at the tracker whether any ultrasonic signals are being echoed or reflected back from an obstacle interposed between the tracker and the guider, and triggering a warning condition from at least one of the tracker and the guider upon detection of an echo.

22. A method as defined in claim 15, further including the step of generating remote control commands to be carried by the encoded RF signal upon reception through a user interface of the guider.

23. An automated object following system comprising:
   a tracker associated with a following device, and a guider associated with an object to be followed;
   the tracker including:
      a first processor;
      at least two means for generating an encoded ultrasonic signal each having a control input communicating with the first processor for emitting an encoded ultrasonic signal generally toward the guider in response to a command signal from the first processor, the encoded ultrasonic signals carrying signal source identification and timing information; and
      a radio frequency (RF) receiver communicating with the first processor for receiving from the guider an encoded RF signal carrying information based on the ultrasonic signals for the first processor to determine the distance and direction of the guider relative to the tracker for steering the following vehicle; and
   the guider including:
      an ultrasonic detector for detecting the ultrasonic signals generated by the ultrasonic means of the tracker;
      a second processor communicating with the ultrasonic detector for encoding information to be carried by an RF signal to the tracker and based on the ultrasonic signals for the tracker to determine the distance and direction of the guider relative to the tracker; and
      an RF transmitter communicating with the second processor for transmitting the encoded RF signal to the RF receiver of the tracker, and wherein the tracker further includes a plurality of infrared (IR) transmitters communicating with the first processor, each of the IR transmitters oriented in a slightly different direction relative to an adjacent IR transmitter for emitting an encoded IR signal carrying source identification information generally toward the guider, and wherein the guider further includes an IR receiver communicating with the second processor for detecting at least one of the encoded IR signals generated by the IR transmitters, the encoded RF signal carrying information based on the encoded ultrasonic signals and which of the encoded IR signals were received by the IR receiver.

24. An automated object following system comprising:
   a tracker associated with a following device, and a guider associated with an object to be followed;
   the tracker including:
      a first processor;
      at least two ultrasonic transducers for generating an encoded ultrasonic signal each having a control input communicating with the first processor for emitting an encoded ultrasonic signal generally toward the guider in response to a command signal from the first processor, the encoded ultrasonic signals carrying signal source identification and timing information, each of the ultrasonic transducers being receptive to echoes or ultrasonic signals reflected back to the tracker from an obstacle interposed between the tracker and the guider, and wherein the tracker includes a warning indicator coupled to the first processor for being triggered upon reception of echoes; and
      a radio frequency (RF) receiver communicating with the first processor for receiving from the guider an encoded RF signal carrying information based on the ultrasonic signals for the first processor to determine the distance and direction of the guider relative to the tracker for steering the following vehicle; and
   the guider including:
      an ultrasonic detector for detecting the ultrasonic signals generated by the ultrasonic transducers of the tracker;
      a second processor communicating with the ultrasonic detector for encoding information to be carried by an RF signal to the tracker and based on the ultrasonic signals for the tracker to determine the distance and direction of the guider relative to the tracker; and
      an RF transmitter communicating with the second processor for transmitting the encoded RF signal to the RF receiver of the tracker.

25. An automated object following system comprising:
   a tracker associated with a following device, and a guider associated with an object to be followed;
   the tracker including:
      a first processor;
      at least two means for generating an encoded ultrasonic signal each having a control input communicating with the first processor for emitting an encoded ultrasonic signal generally toward the guider in response to a command signal from the first processor, the encoded ultrasonic signals carrying signal source identification and timing information; and
      a radio frequency (RF) receiver communicating with the first processor for receiving from the guider an encoded RF signal carrying information based on the ultrasonic signals for the first processor to determine the distance and direction of the guider relative to the tracker for steering the following vehicle; and
   the guider including:
      an ultrasonic detector for detecting the ultrasonic signals generated by the ultrasonic means of the tracker;

a second processor communicating with the ultrasonic detector for encoding information to be carried by an RF signal to the tracker and based on the ultrasonic signals for the tracker to determine the distance and direction of the guider relative to the tracker;

an RF transmitter communicating with the second processor for transmitting the encoded RF signal to the RF receiver of the tracker; and means for inputting remote control commands to be carried by the encoded RF signal for manually controlling the tracker.

26. An automated object following system comprising:

a tracker associated with a following device, and a guider associated with an object to be followed;

the tracker including:

a first processor;

at least two means for generating an encoded ultrasonic signal each having a control input communicating with the first processor for emitting an encoded ultrasonic signal generally toward the guider in response to a command signal from the first processor, the encoded ultrasonic signals carrying signal source identification and timing information; and a radio frequency (RF) receiver communicating with the first processor for receiving from the guider an encoded RF signal carrying information based on the ultrasonic signals for the first processor to determine the distance and direction of the guider relative to the tracker for steering the following vehicle; and the guider including:

an ultrasonic detector for detecting the ultrasonic signals generated by the ultrasonic means of the tracker;

a second processor communicating with the ultrasonic detector for encoding information to be carried by an RF signal to the tracker and based on the ultrasonic signals for the tracker to determine the distance and direction of the guider relative to the tracker;

an RF transmitter communicating with the second processor for transmitting the encoded RF signal to the RF receiver of the tracker; and means for selecting an operational mode of the tracker to be transmitted as a command signal on the encoded RF signal, the operational modes including a constant distance following mode, a same path and pace following mode, and a manual steering mode.

27. A method of directing a following device associated with a tracker toward a movable, followed object associated with a guider, comprising the steps of:

generating at the tracker at least two encoded ultrasonic signals directed generally toward the guider, each encoded ultrasonic signal originating from distinct sources spaced from each other, and each encoded ultrasonic signal carrying signal source identification and timing information;

receiving at the guider the encoded ultrasonic signals, and generating therefrom an encoded RF signal back to the tracker for directing the following device toward the followed object, the encoded RF signal carrying distance and direction information based on the ultrasonic signals;

determining at the tracker the position of the guider relative to the tracker based on the information carried by the encoded RF signal for steering the following device;

generating at the tracker a plurality of encoded infrared (IR) signals generally toward the guider, each of the IR signals carrying source identification information and being directed in slightly different direction relative to the other IR signals;

receiving at the guider the encoded IR signals; and wherein the step of generating the encoded RF signal includes carrying distance and direction information of the followed object relative to the following device based on the information carried by the ultrasonic signals and based on which of the IR signals is received at the guider.

28. A method as defined in claim 27, wherein the step of generating the plurality of IR signals includes generating each signal one at a time in a predetermined sequence known by the tracker and the guider in order to permit the guider to determine the source of a received IR signal.

29. A method as defined in claim 27, wherein the step of generating the encoded RF signal is only in response to receiving both ultrasonic and IR signals.

30. A method of directing a following device associated with a tracker toward a movable, followed object associated with a guider, comprising the steps of:

generating at the tracker at least two encoded ultrasonic signals directed generally toward the guider, each encoded ultrasonic signal originating from distinct sources spaced from each other, and each encoded ultrasonic signal carrying signal source identification and timing information;

receiving at the guider the encoded ultrasonic signals, and generating therefrom an encoded RF signal back to the tracker for directing the following device toward the followed object, the encoded RF signal carrying distance and direction information based on the ultrasonic signals;

determining at the tracker the position of the guider relative to the tracker based on the information carried by the encoded RF signal for steering the following device;

detecting at the tracker whether any ultrasonic signals are being echoed or reflected back from an obstacle interposed between the tracker and the guider; and triggering a warning condition from at least one of the tracker and the guider upon detection of an echo.

* * * * *

UNITED STATES PATENT AND TRADEMARK OFFICE
CERTIFICATE OF CORRECTION

PATENT NO.   : 6,327,219 B1
DATED        : December 4, 2001
INVENTOR(S)  : Ruiming Zhang et al.

It is certified that error appears in the above-identified patent and that said Letters Patent is hereby corrected as shown below:

<u>Title page,</u>
Item [73], Assignee should read -- VI & T Group, Inc., Freshmeadows, NY --

Signed and Sealed this

Twenty-fifth Day of February, 2003

JAMES E. ROGAN
*Director of the United States Patent and Trademark Office*